United States Patent
Liu et al.

(10) Patent No.: US 7,496,754 B2
(45) Date of Patent: Feb. 24, 2009

(54) WIRELESS SECURITY USING MEDIA ACCESS CONTROL ADDRESS FILTERING WITH USER INTERFACE

(75) Inventors: Calvin Y. Liu, Irvine, CA (US); Sheng-Chiao Chang, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 722 days.

(21) Appl. No.: 11/096,557

(22) Filed: Apr. 1, 2005

(65) Prior Publication Data

US 2006/0236376 A1    Oct. 19, 2006

(51) Int. Cl.
*G06F 9/00* (2006.01)
(52) U.S. Cl. .................. 713/168; 713/178; 713/182; 380/247; 380/270
(58) Field of Classification Search ................ 713/168, 713/178, 182; 380/247, 270
See application file for complete search history.

(56) References Cited

U.S. PATENT DOCUMENTS

| | | | |
|---|---|---|---|
| 6,185,436 B1 * | 2/2001 | Vu | 455/558 |
| 6,456,857 B1 * | 9/2002 | Bos et al. | 455/550.1 |
| 6,741,868 B1 * | 5/2004 | Park et al. | 455/552.1 |
| 6,950,419 B1 * | 9/2005 | Park et al. | 370/338 |

* cited by examiner

*Primary Examiner*—Thomas R Peeso
(74) *Attorney, Agent, or Firm*—MacPherson Kwok Chen & Heid, LLP.; David S. Park

(57) ABSTRACT

An improved system, apparatus, and method for securing a network using MAC address filtering is provided. Advantageously, the present invention does not require that a client computer be powered on, and instead provides an efficient user interface for displaying a requestor's MAC address and for allowing or denying the device with an associated MAC address access to the network. Parameters per allowed MAC address may also be provided.

17 Claims, 2 Drawing Sheets

WIRELESS SECURITY USING MEDIA ACCESS CONTROL ADDRESS FILTERING WITH USER INTERFACE

TECHNICAL FIELD

The present invention relates generally to wireless security and, more particularly, to a system, apparatus, and method for wireless security using media access control (MAC) addresses.

BACKGROUND

Security is an important concern on many networks, but this is especially true for a wireless network, such as a wireless local area network (WLAN), where information travels back and forth through the air and is open to eavesdropping and interception. By default, many WLAN access points broadcast their presence and grant access to any computer that requests it.

To deal with the issue of unauthorized access, MAC address filtering has been investigated. The MAC address is a unique value associated with a network adapter. MAC addresses are 12-digit hexadecimal numbers (48 bits in length). By convention, MAC addresses are usually written in one of the following two formats:

MM:MM:MM:SS:SS:SS

MM-MM-MM-SS-SS-SS

The first half of a MAC address contains the ID number of the adapter manufacturer. The second half of a MAC address represents the serial number assigned to the adapter by the manufacturer.

Every piece of network hardware ever made has a unique (no two network devices have the same MAC address) and permanent (the MAC address is "burned" into the hardware and cannot be changed) MAC address. A MAC address is usually an attribute of the network interface card (NIC) and not the computer itself unless the computer has a built-in WLAN adapter. One can usually find a device's MAC address on a label physically affixed to it or through an operating system utility to get a list of the MAC address of each network card in the system.

Many wireless fidelity (WiFi) access points (APs) and routers are built with features for hardware or MAC address filtering. MAC filtering specifies a list of MAC addresses that may connect to the access point, and thus dictates what devices are authorized to access the wireless network. Any address not explicitly defined will be denied access. However, this feature is normally turned "off" by the manufacturer because of the difficulty of proper set up. Many lay users may also find the graphical user interface (GUI) or the filtering setup too technical or time consuming.

Normally, to set up MAC address filtering, the WLAN administrator must manually configure a list of clients that will be allowed access to the network. First, the MAC addresses of each client must be obtained from the operating system or configuration utility. Then, the addresses must be manually entered into a configuration screen for the wireless AP or router. Finally, the filtering option is switched on.

Once enabled, whenever the wireless AP or router receives a request to associate with the WLAN, the MAC address of that client is compared against the administrator's access list. Clients on the list authenticate as normal; clients not on the list are denied any access to the WLAN. In order to alter the clients on the access list, the administrator must manually go into the configuration screen for the wireless AP or router and change the list.

Disadvantageously, conventional MAC filtering has required the computer to be powered on to enter and set up the MAC address list, the user has had to manually enter/remove the MAC address, and there has been a lack of flexibility in controlling parameters for the list. Accordingly, an improved MAC filtering system, apparatus, and method are highly desirable.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides an improved system, apparatus, and method for securing a network using MAC address filtering. Advantageously, the present invention does not require that a computer be powered on, and instead provides an efficient user interface to set up MAC address filtering with increased flexibility.

Figure 1:
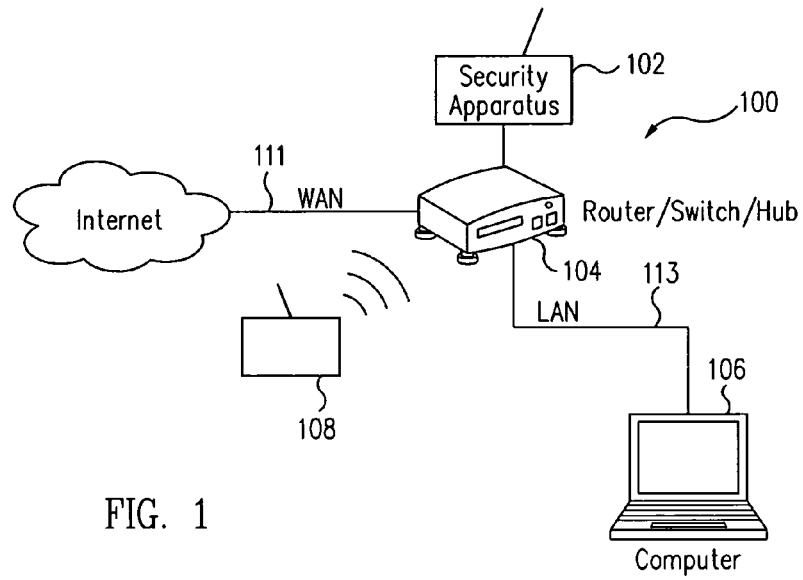
FIG. 1 shows a block diagram of a network security system in accordance with an embodiment of the present invention.

Referring now to FIG. 1, a block diagram of a network security system 100 is shown in accordance with an embodiment of the present invention. System 100 includes a security apparatus 102 operably coupled to an access point 104, which in turn is operably coupled to a wide area network (WAN) 111 and a local area network (LAN) 113. A computer 106 is optionally included in system 100 via LAN 113. Access point 104 may be operably coupled to the Internet via WAN 111. A wireless device 108 is shown requesting access to either WAN 111 or LAN 106 through access point 104.

Security apparatus 102 may be operably coupled to access point 104 via a wireless protocol or via a cable, and is described in more detail below in conjunction with FIGS. 2 through 4.

Access point 104 may be any device that allows wireless-equipped computers and other devices to communicate with a wired network. In one example, access point 104 is able to support wireless fidelity (WiFi) in general, and the 802.11a, 802.11b, and/or 802.11g wireless networking standards in particular. Access point 104 may include a variety of typical routers, switches, and/or hubs, and in one example can support the 10/100 Base-T standard, automatic negotiation, and automatic MDIX. Examples of applicable access points for the present invention include applicable access points (e.g., the Wireless-B Access Point (Model WAP11), Wireless-G Access Point (Model WAP54G), and Dual-Band Wireless A+G Access Point (Model WAP55AG)) and routers available from Linksys, a division of Cisco Systems, Inc., of San Jose, Calif.

Computer 106 may include a variety of typical computers, and in one example is a typical personal computer including a general or special purpose processor, with network capabilities. In one example, computer 106 comprises a CPU, a memory, and a network adapter, which are interconnected by a bus. Other conventional means, such as a display, a keyboard, a printer, a bulk storage device, and a ROM, may also be connected to the bus. The memory stores network and telecommunications programs and an operating system (OS). The above-mentioned elements of computer 106 are well-known to the skilled person and commercially available.

Wireless device 108 may include wireless handsets, PDAs, laptops, and other mobile wireless devices, that have at least a wireless fidelity (WiFi) radio transceiver for access to a network (e.g., a wireless LAN or the Internet). Wireless device 108 is associated with at least one MAC address.

Figure 2:
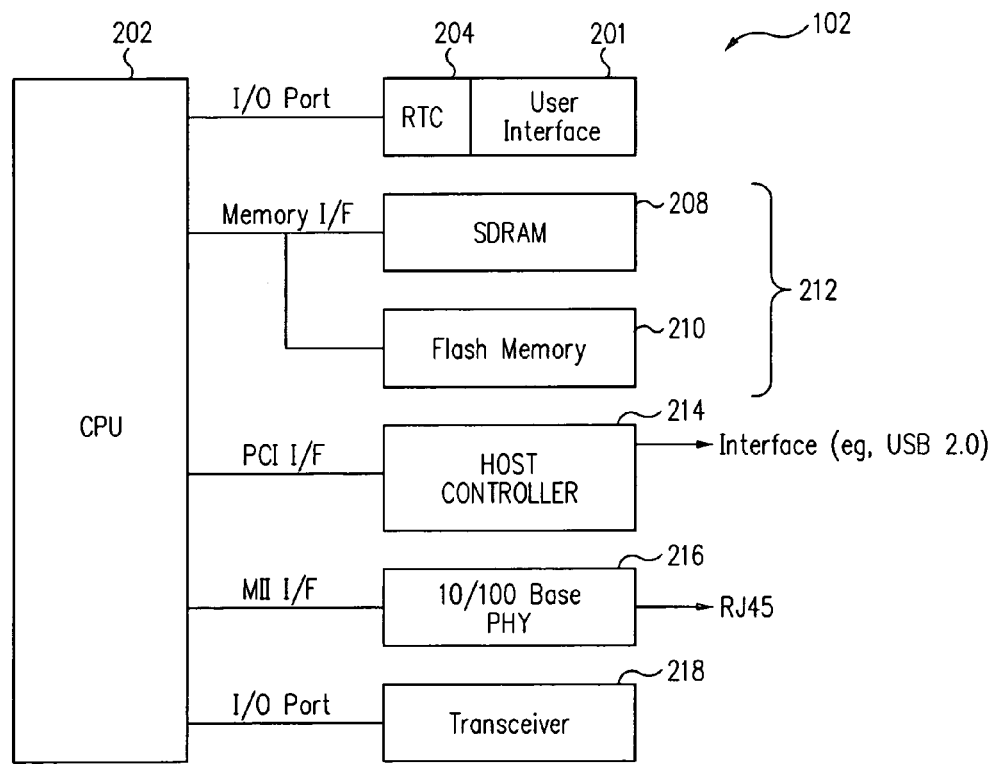
FIG. 2 shows a block diagram of a wireless security apparatus in accordance with an embodiment of the present invention.

Referring now to FIG. 2 in conjunction with FIG. 1, a block diagram of security apparatus 102 is shown in accordance with an embodiment of the present invention. Security apparatus 102 includes a central processing unit (CPU) 202 operably coupled to: a real-time clock (RTC) 204 and a user interface 201 via an input/output port; a memory 212 (e.g., SDRAM 208 and flash memory 210) via a memory interface; a host controller 214 (e.g., a Universal Serial Bus (USB) host controller) via a peripheral component interconnect (PCI) interface; a LAN connector 216 (e.g., a 10/100 Base-T Ethernet port) via a MII interface; and a transmitter/receiver (transceiver) 218 via an input/output port.

CPU 202 is a high performance, highly integrated, and highly flexible system-on-chip (SOC) in one example. CPU 202 may include a variety of processors, and in one example is a IXP420 266 MHz processor available from Intel Corporation of Santa Clara, Calif. Conventional CPUs are applicable and may also be used.

Memory 212 may include a variety of memories, and in one example includes SDRM 208 and flash memory 210. As a further example, 32 MB of SDRAM by way of two 8 MB×16 SDR DRAM and 8 MB of flash memory by way of one 64 Mbits NOR type flash memory may be utilized.

Host controller 214 may include a storage device interface, which may be a USB 2.0 interface in one example. The storage device interface may be used to connect to memory cards and/or flash drives. In particular, a storage device interface may receive a storage device including a predetermined list of MAC addresses allowed and/or denied access to the network for downloading to memory 212. The predetermined list may be provided from various sources, including but not limited to AP 104 or client computer 106. It is noted that the predetermined list may be provided to security apparatus 102 by other methods as well (e.g., wireless). Host controller 214 is not limited to a single storage device interface or the USB 2.0 interface and may include a greater number and/or different types of interfaces (e.g., PCMCIA).

LAN connector 216 provides for connection of security apparatus 102 to a LAN, access point, or router, and in one example supports the 10/100 Base-T standard, automatic negotiation, and automatic medium dependent interface crossover (MDIX). In a further example, LAN connector 216 includes a 10/100 Ethernet RJ-45 port.

Transceiver 218 is a device that both transmits and receives/detects digital and/or analog signals, and in the context of the present invention directly detects wireless signals from wireless device 108 requesting access to a network and/or detects signals first passed through access point 104, detecting signals through a network wire and applying signals onto the network wire.

User interface 201 is operably coupled to processor 202 for displaying the at least one MAC address associated with wireless device 108 and for allowing or denying the device access to network 111 or 113. In one example, user interface 201 includes a display and a switch.

Figure 3A:
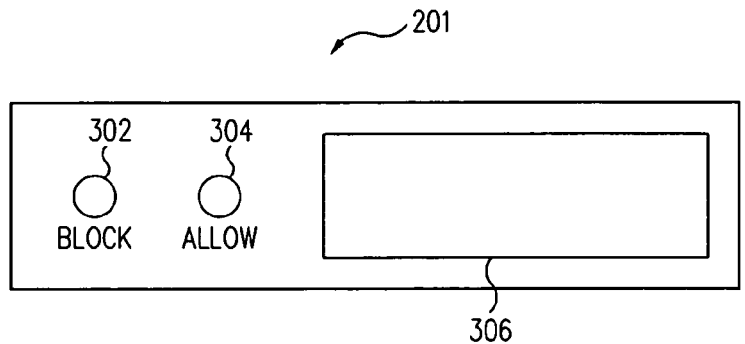
FIGS. 3A and 3B show a block diagram of a user interface in accordance with embodiments of the present invention.
Figure 3B:
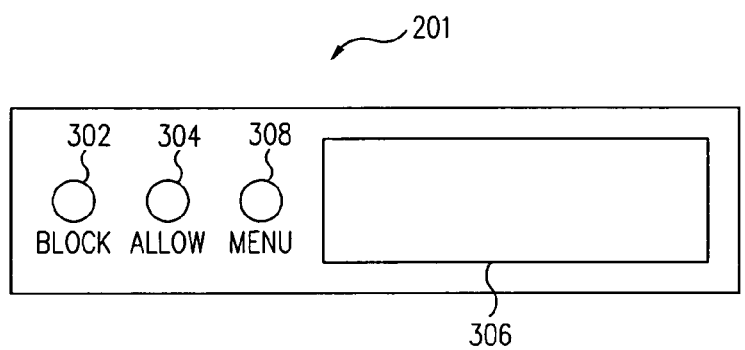

Referring now to FIGS. 3A and 3B in conjunction with FIGS. 1 and 2, block diagrams of examples of user interfaces are shown in accordance with embodiments of the present invention.

User interface 201 may include a display 306, such as a liquid crystal display (LCD), and buttons 302 and 304 operably coupled to CPU 202, for interfacing with a user to indicate allowance or denial of access to a network for a wireless device (with an associated MAC address) requesting access to the network. In the example illustrated in FIG. 3A, button 302 may be pressed to send a signal to CPU 202 to block access while button 304 may be pressed to send a signal to CPU 202 to allow access. Optionally, in the example illustrated in FIG. 3B, an additional button 308 may be used to set parameters per MAC address allowed access to the network. Examples of parameters may include an expiration time for access (e.g., from unlimited to hours or days), an expiration date for access, and an identification reference that may be associated with the MAC address (e.g., a name or an alpha-numeric identification). RTC 204 may be used for entering time-based parameters. In other embodiments, display 306 may be a touch screen that can send signals to CPU 202 based upon the touch of a user on the screen, indicating allowance or denial of access to particular MAC addresses and also for providing access parameters. It is noted that other user interfaces that display a requestor's MAC address, allow for granting or denying access, and optionally allow for setting of parameters, is within the scope of the present invention.

User interface 201 may further include a variety of light emitting diodes (LEDs) for indicating system functionality to the security apparatus user. In one example, two LEDs may be used in conjunction with buttons 302 and 304 to indicate different functions or status of security apparatus 201. For example, an LED may be on when the apparatus is powered on and ready for use or off when the device is powered off. An LED may blink when the device is booting up or shutting down or providing MAC address filtering against a previously denied MAC address. An LED may also blink when the user is given a time period to deny or grant access to a device with an associated MAC address requesting access to the network. An LED may also be a different color to indicate device error or to differentiate between an allowed or blocked MAC address. An LED may also indicate connection to and/or operation with an access point, LAN, and/or a portable storage device such as a USB flash drive. In one embodiment, firmware and hardware may be used in conjunction with the LED(s) to indicate status of the security apparatus, connection to a USB device, and/or connection to and operation with the access point or LAN. The above-described LED system is simply an example and other LED systems with more or less LEDs may be applicable.

In another embodiment, user interface 201 may include a buzzer to indicate system function information to the user. In one example, a buzzer may beep as follows: when the security apparatus is ready for use; when a signal requesting access to the network is detected; and when a button is pressed.

In yet another embodiment, user interface 201 may allow for entering of a wireless equivalent privacy (WEP) or WiFi protected access (WPA) key associated with network 111 or 113. Such keys may be entered via an alpha-numeric keyboard in one example.

Figure 4:
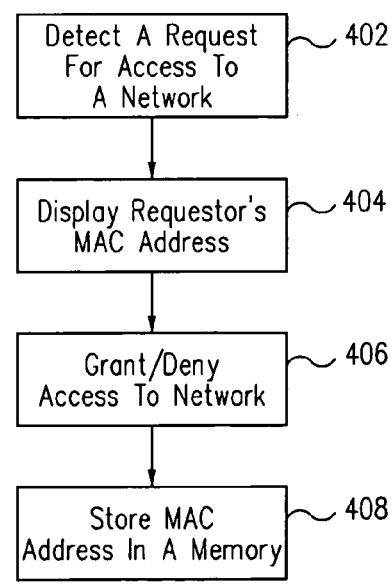
FIG. 4 shows a flowchart of a method for securing a network in accordance with an embodiment of the present invention.

Referring now to FIG. 4 in conjunction with FIGS. 1 through 3B, a flowchart of a method for securing a network is shown in accordance with an embodiment of the present invention. At step 402, transceiver 218 of security apparatus 102 detects a signal (including an associated MAC address) requesting access to network 111 or 113 either directly from wireless device 108 or through access point 104. At step 404, CPU 202 processes the signal from transceiver 218 and outputs the requestor's MAC address to user interface 201, in one embodiment displaying the MAC address on a display. At step 406, the MAC address is granted or denied access to the network by a user providing input to CPU 202 via user interface 201 (e.g., by pressing buttons 302 or 304 and/or 308). RTC 204 may be utilized to provide a time period in which the user may grant or deny access upon detecting the request signal and also to provide access parameters based upon time for allowed MAC addresses (e.g., access expiration time and/or date). At step 408, CPU 202 processes the input information from user interface 201 and stores the MAC address in memory 212 to compile a list of MAC addresses that are granted access to the network. By default in this embodiment, MAC addresses not listed in memory 212 will be denied access to the network unless authorized through the process outlined in FIG. 4. In another embodiment, CPU 202 may store MAC addresses in memory 212 to compile a list or lists of MAC addresses that are granted or denied access to the network. A list or lists of MAC addresses that are denied access may be used for auditing or implementing additional security options if so desired. In yet another embodiment, an access list and/or a deny list may be stored within security apparatus 102 and/or access point 104. Data may be sent from security apparatus 102 to access point 104 via transceiver 218 or through a cable.

In accordance with an embodiment of the present invention, a setup wizard for security apparatus 102 may allow the user to 1) identify an existing wireless access point/router; 2) retrieve a MAC address list from the existing access point/router; and 3) create a list if no such list exists.

In accordance with an embodiment of the present invention, an LED flashes while detecting client attempts to associate with the access point/router and the MAC address of the client may be shown on the LCD screen. The client may be granted access by activating (e.g., by pressing) a first switch (e.g., a button), which may be labeled "grant" or "access" or "allow" or a similar reference. If the first switch is activated, the LCD screen may display access parameters or options for the particular MAC address, such as an expiration time and address identification. If the first switch is not activated within a preselected time period, such as 5 minutes, the LED may go OFF and the MAC address is by default denied access since the address will not be included on an access list compiled by the CPU. In another embodiment, an access list and a deny list may both be stored within the security apparatus and/or the access point/router.

Referring back to FIG. 2, in accordance with an embodiment of the present invention, a highly optimized and efficient operating system (OS) may be embedded in memory 208. Although failures, crashes, or conflicts in a network or client computer caused by unexpected conditions may not be prevented, the embedded OS of the security apparatus can be used to operate the security apparatus independent from a client computer. Advantageously, the wireless security apparatus of the present invention provides a reliable and secure networking environment.

Security apparatus 102 may also support various file sharing protocols, including but not limited to SMB over TCP/IP, HTTP, FTP, and Windows file manager. In one embodiment, for file sharing via various protocols, user name and password may be checked when the user tries to access a MAC address list. Any failure results in access only to public data. With a successful user name and password, access is provided to private data.

In accordance with another embodiment of the present invention, firmware in security apparatus 102 is capable of logging the status of the security system and related access points and sending electronic mail to users for various situations, including but not limited to firmware upgrade, reset to default, backup copying of MAC lists, and hardware error. Functions such as restart and backup copy are capable of being scheduled utilizing RTC 204.

In accordance with another embodiment of the present invention, security apparatus 102 may be managed or controlled via the Web. In one embodiment, data may be accessed and files shared via a Web browser. User name and password may be required before access is allowed. MAC addresses, lists, and apparatus or system settings may be added to or edited via the Web. Accordingly, the present invention advantageously provides for remote management and monitoring via the Internet.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A wireless security apparatus, comprising:
   a transceiver for detecting a wireless signal originating from a device having a media access control (MAC) address, the wireless signal requesting access to a network;
   a processor operably coupled to the transceiver;
   a user interface operably coupled to the processor for displaying the MAC address and for allowing or denying the device access to the network; and
   a memory coupled to the processor for storing the MAC address to create a list of MAC addresses that are allowed access to the network.

2. The apparatus of claim 1, wherein the user interface allows for setting of a parameter per MAC address stored in the memory.

3. The apparatus of claim 2, wherein the parameter is selected from the group consisting of an expiration time, an expiration date, and an identification reference.

4. The apparatus of claim 1, wherein the user interface allows for entering of a wireless equivalent privacy (WEP) or WiFi protected access (WPA) key.

5. The apparatus of claim 1, wherein the user interface includes at least one light emitting diode for indicating MAC address filtering functionality.

6. The apparatus of claim 1, wherein the memory further includes a list of MAC addresses that are denied access to the network.

7. The apparatus of claim 1, further comprising a local area network (LAN) connector including a 10/100 Ethernet RJ45 port.

8. The apparatus of claim 1, further comprising a port for receiving a storage device that includes a list of MAC addresses to be allowed or denied access to the network.

9. A wireless security apparatus, comprising:
   means for detecting a wireless signal originating from a device having a media access control (MAC) address, the wireless signal requesting access to a network;
   means for processing data operably coupled to the means for detecting;

means for displaying the MAC address and for allowing or denying the device access to the network, the means for displaying and for allowing or denying being operably coupled to the means for processing; and means for storing the MAC address to create a list of MAC addresses that are allowed access to the network.

10. A wireless security system, comprising:

a network;

an access point operably coupled to the network; and a security apparatus operably coupled to the access point, the security apparatus including:

a transceiver for detecting a wireless signal originating from a device having a media access control (MAC) address, the signal requesting access to the network;

a processor operably coupled to the transceiver;

a user interface operably coupled to the processor for displaying the MAC address and for allowing or denying the device access to the network; and a memory coupled to the processor for storing the MAC address to create a list of MAC addresses that are allowed access to the network.

11. A method of securing a network, the method comprising:

detecting a request for access to a network by a device having a media access control (MAC) address;

displaying the MAC address on a user interface;

receiving information from the user interface indicating whether the device should be granted or denied permission to access the network; and storing the MAC address in a memory to control access to the network.

12. The method of claim 11, wherein the information is provided via a user interface.

13. The method of claim 11, further comprising setting a parameter per MAC address granted access to the network.

14. The method of claim 13, wherein the parameter is selected from the group consisting of an expiration time, an expiration date, and an identification reference.

15. The method of claim 11, further comprising transferring a predetermined list of MAC addresses to a wireless security apparatus.

16. The method of claim 11, further comprising storing the MAC address in the memory to create a list of MAC addresses that are allowed access to the network.

17. The method of claim 11, further comprising storing the MAC address in the memory to create a list of MAC addresses that are denied access to the network.

* * * * *